(12) United States Patent
Pal et al.

(10) Patent No.: US 8,053,938 B2
(45) Date of Patent: Nov. 8, 2011

(54) ENHANCED MOTOR COOLING SYSTEM

(75) Inventors: Debabrata Pal, Hoffman Estates, IL (US); Mark Hamilton Severson, Rockford, IL (US); Roy D. Rasmussen, Rockford, IL (US)

(73) Assignee: Hamilton Sundstand Corporation, Windsor Locks, CT (US)

( * ) Notice: Subject to any disclaimer, the term of this patent is extended or adjusted under 35 U.S.C. 154(b) by 614 days.

(21) Appl. No.: 11/937,688

(22) Filed: Nov. 9, 2007

(65) Prior Publication Data

US 2009/0121564 A1     May 14, 2009

(51) Int. Cl.
*H02K 9/04* (2006.01)

(52) U.S. Cl. ............... 310/52; 310/58; 310/59

(58) Field of Classification Search ............... 310/58, 310/52, 59, 64, 216.008, 216.011, 216.014, 310/216.055, 216.056, 216.119
See application file for complete search history.

(56) References Cited

U.S. PATENT DOCUMENTS

| | | | |
|---|---|---|---|
| 890,577 A * | 6/1908 | Name not available | 310/65 |
| 996,927 A * | 7/1911 | Name not available | 310/65 |
| 1,487,221 A | 3/1924 | Ehrmann | |
| 2,818,515 A * | 12/1957 | Anton Dolenc | 310/57 |
| 3,436,579 A * | 4/1969 | Elgar Everett C et al. | 310/216.056 |
| 3,684,906 A * | 8/1972 | Lenz | 310/61 |
| 4,301,386 A | 11/1981 | Schweder et al. | |
| 4,341,966 A * | 7/1982 | Pangburn | 310/61 |
| 4,365,178 A * | 12/1982 | Lenz | 310/61 |
| 5,173,629 A * | 12/1992 | Peters | 310/216.014 |
| 5,331,238 A * | 7/1994 | Johnsen | 310/58 |
| 5,491,371 A * | 2/1996 | Ooi | 310/58 |
| 5,859,483 A * | 1/1999 | Kliman et al. | 310/58 |
| 5,982,071 A | 11/1999 | Ehrick | |
| 6,114,784 A * | 9/2000 | Nakano | 310/59 |
| 6,204,580 B1 * | 3/2001 | Kazmierczak | 310/52 |
| 6,727,609 B2 | 4/2004 | Johnsen | |
| 6,982,506 B1 | 1/2006 | Johnsen | |
| 7,119,461 B2 | 10/2006 | Dooley | |
| 7,122,923 B2 | 10/2006 | Lafontaine et al. | |
| RE39,416 E | 12/2006 | Shin et al. | |
| 7,633,194 B2 * | 12/2009 | Dawsey et al. | 310/57 |

FOREIGN PATENT DOCUMENTS

| | | |
|---|---|---|
| SU | 437176 A1 | 7/1974 |
| WO | 2005/022718 A1 | 3/2005 |
| WO | WO 2005022718 A1 * | 3/2005 |

OTHER PUBLICATIONS

Extended European Search Report for EP08252787.0 dated Sep. 27, 2010.

* cited by examiner

*Primary Examiner* — Quyen Leung
*Assistant Examiner* — Naishadh Desai
(74) *Attorney, Agent, or Firm* — Carlson, Gaskey & Olds, P.C.

(57) ABSTRACT

A core assembly for an electric motor includes a heat exchanger comprising a plurality of fins. The fins define a plurality of cooling air passages that include offset fins that disrupt cooling air flow to reduce the formation of boundary layers and improve heat transfer capacity.

18 Claims, 6 Drawing Sheets

ENHANCED MOTOR COOLING SYSTEM

BACKGROUND OF THE INVENTION

This invention relates to cooling features for an electric motor. More particularly, this invention relates to features for air cooling an electric motor.

An electric motor includes a stator and a rotor. Heat generated by operation is controlled by directing air flow over and through a plurality of cooling fins disposed on an exterior surface of the stator. The cooling fins typically comprise a plurality of aligned fins about the exterior surface of the stator. Air flows through and over the fins to dissipate heat. Increases in loads and desired power generation increases heat produced by the motor and therefore require improved methods and structures for removing heat.

SUMMARY OF THE INVENTION

An example electric motor assembly includes a stator heat exchanger that includes a plurality of fins that define cooling flow paths through which cooling air flows. Each of the disclosed example cooling flow paths includes an offset plate that disrupts cooling air flow.

The example heat exchanger includes a plurality of fins that are disposed on the outer surface of the stator assembly. The stator includes a plurality of plates stacked against each other. Each of the plates includes a plurality of fins disposed about an outer perimeter that are matched with fins from adjacent plates to define cooling air passages. At least one plate includes a fin that is offset relative to the other fins to extend into the flow path and disrupt cooling airflow. The example stator provides improved heat removal capacity by including features that disrupt airflow through each of the cooling air passages.

These and other features of the present invention can be best understood from the following specification and drawings, the following of which is a brief description.

DETAILED DESCRIPTION OF THE EXAMPLE EMBODIMENT

Figure 1:
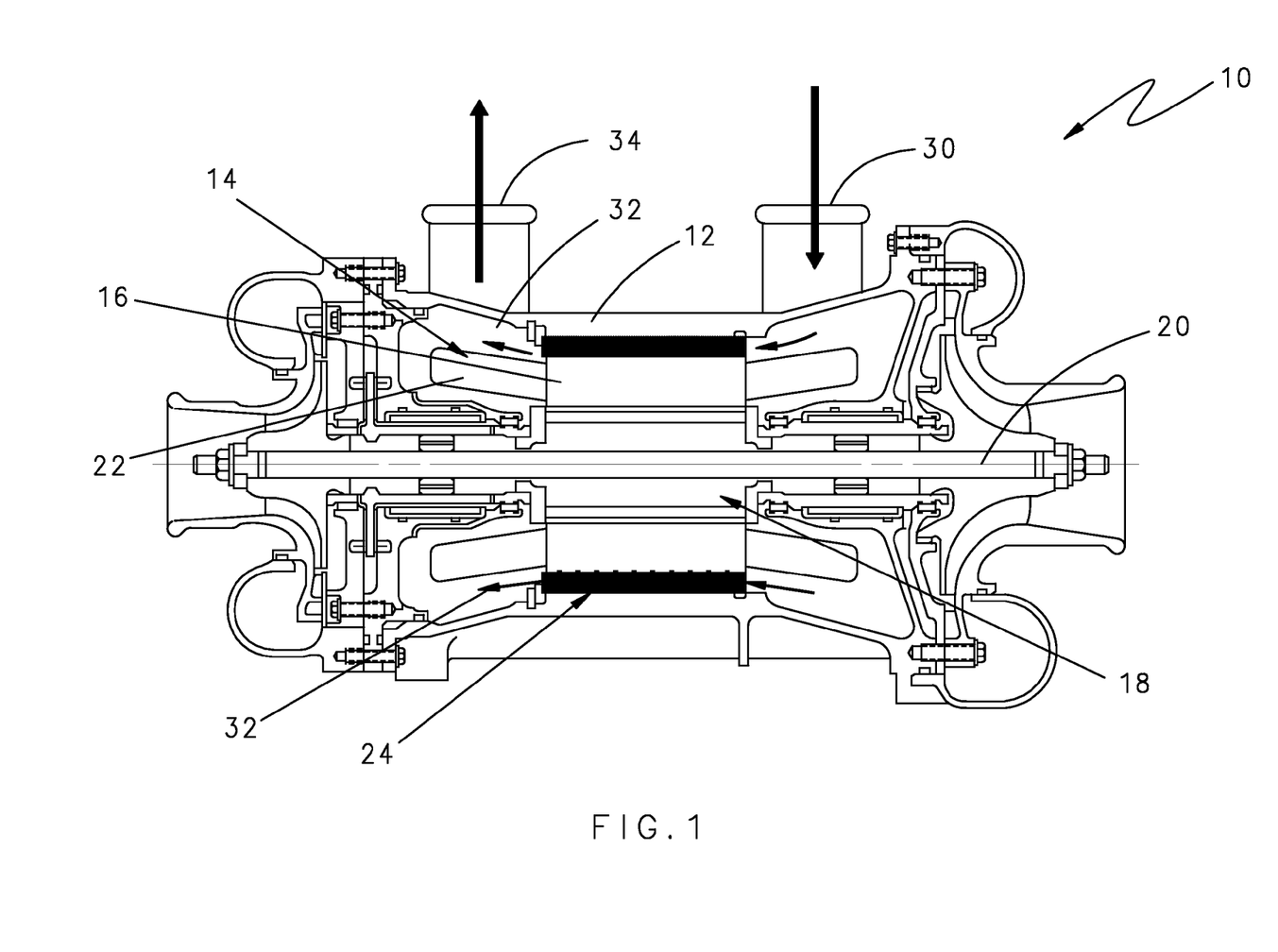
FIG. 1 is a cross-sectional view of an example electric motor assembly.
Figure 2:
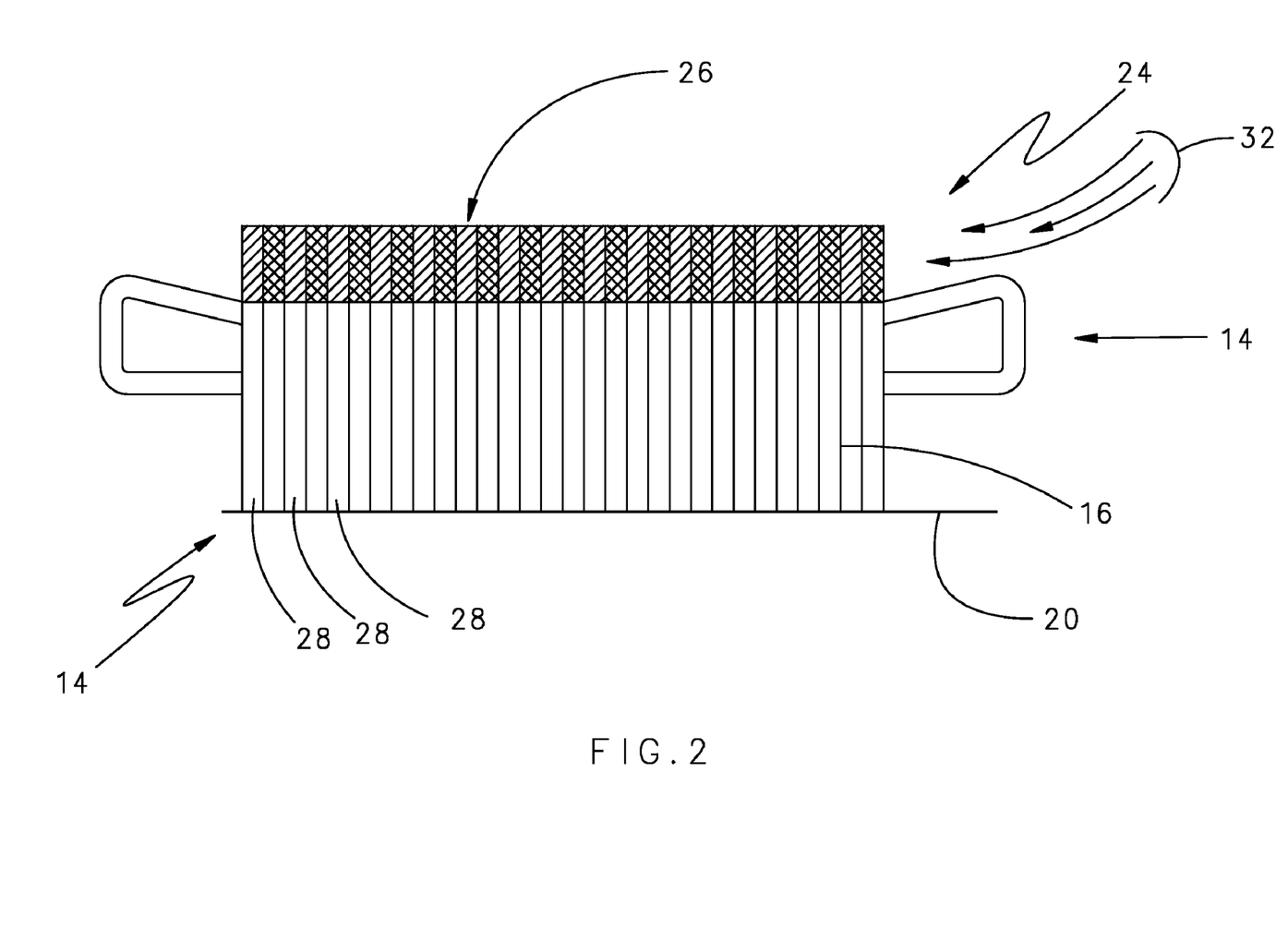
FIG. 2 is a cross-sectional view of an example stator assembly.

Referring to FIGS. 1 and 2, an example electric motor assembly 10 includes a housing 12 with an inlet 30 and an outlet 34. The inlet 30 and outlet 34 provide for the flow of cooling air 32 over an outer surface of a stator 14. The stator 14 defines an inner space within which a rotor 18 rotates about an axis 20. The stator 14 includes a core 16 and a plurality of windings 22. The core 16 is comprised of a plurality of separate plates 28 (FIG. 2) and includes a heat exchanger 24. The heat exchanger 24 is disposed about an outer surface and is exposed to the cooling airflow 32 produced by air flowing between the inlet 30 and the outlet 34.

Figure 3:
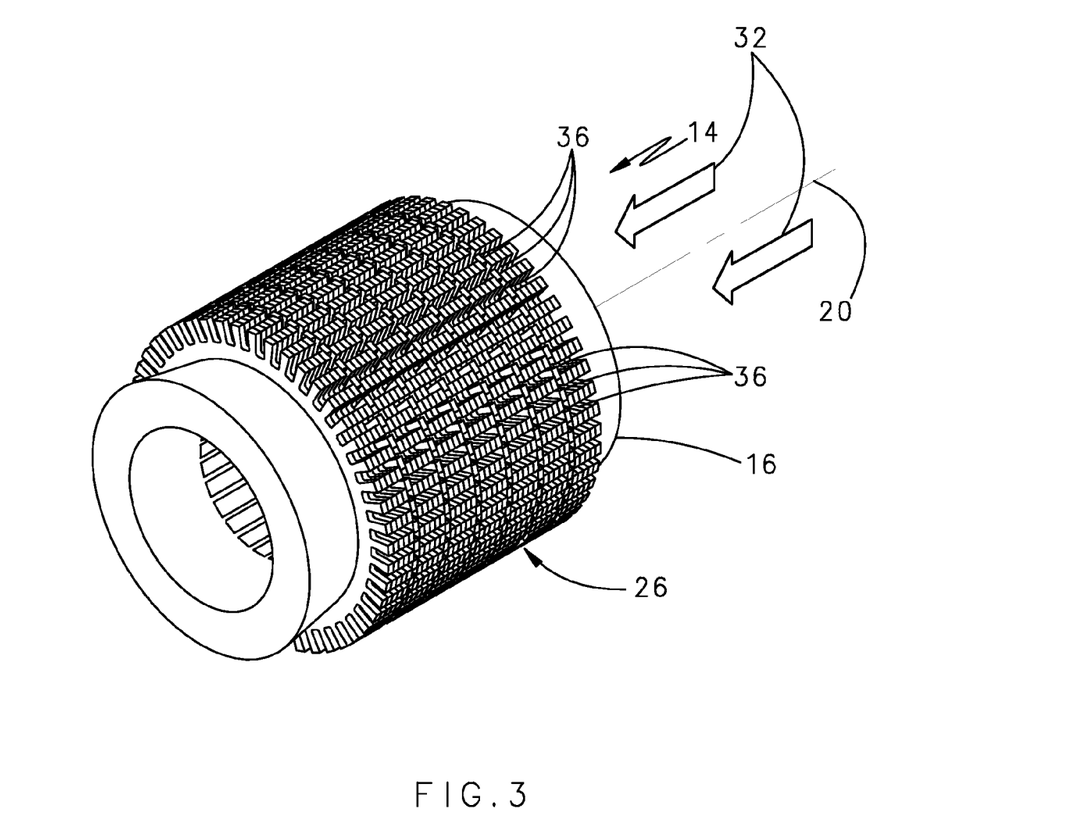
FIG. 3 is a perspective view of an example stator assembly including a plurality of cooling passages about an outer surface.

Referring to FIGS. 2 and 3, the stator 14 includes the core 16 that is comprised of the plates 28 stacked and abutted against each other. Each of the plates 28 includes fins 26. The fins 26 of each of the plates 28 combine to define a plurality of flow passages 36 through which the cooling air 32 flows. The flow passages 36 define the heat exchanger 24 and provide for removal of heat created during operation. Heat generated during operation is removed by the cooling airflow flowing over the outer surface of the passages 36 formed by the stator core 16 and through the plurality of fins 26. The fins 26 increase the surface area over which the cooling air flows to improve heat removal capacity. Each of the cooling air passages 36 includes interruptions that disrupt airflow and reduce formation of large boundary layers that can reduce heat removal capacity.

Figure 4:
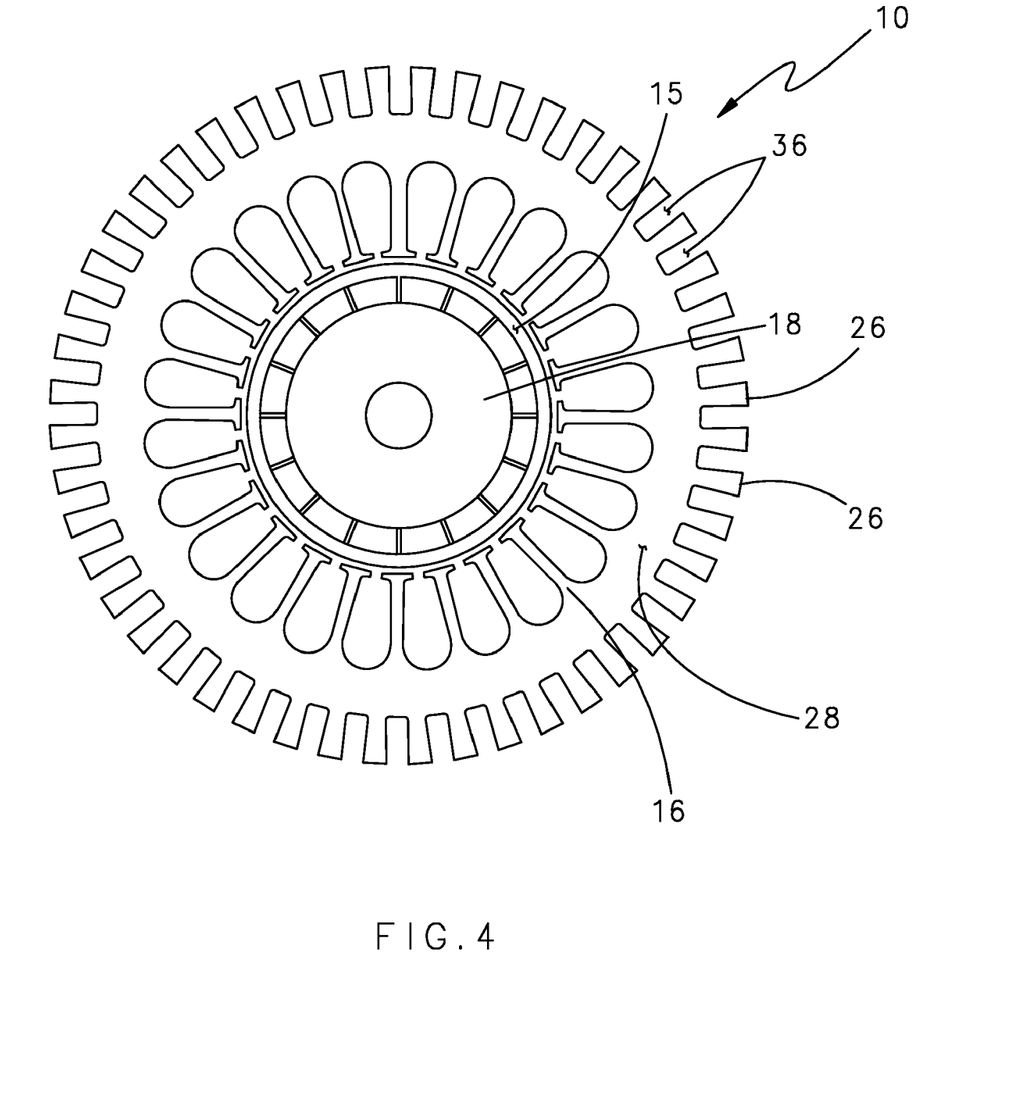
FIG. 4 is a cross-sectional of the example electric motor assembly.

Referring to FIG. 4 each of the plates 28 include a plurality of fins 26. The rotor 18 is disposed for rotation within a space 15 formed by inner structures of the plates 28. Between each of the plurality of fins 26, are defined the cooling air passages 36. The flow of cooling air through these passages 36 substantially removes and carries away heat developed during operation of the electric motor assembly 10.

Figure 5:
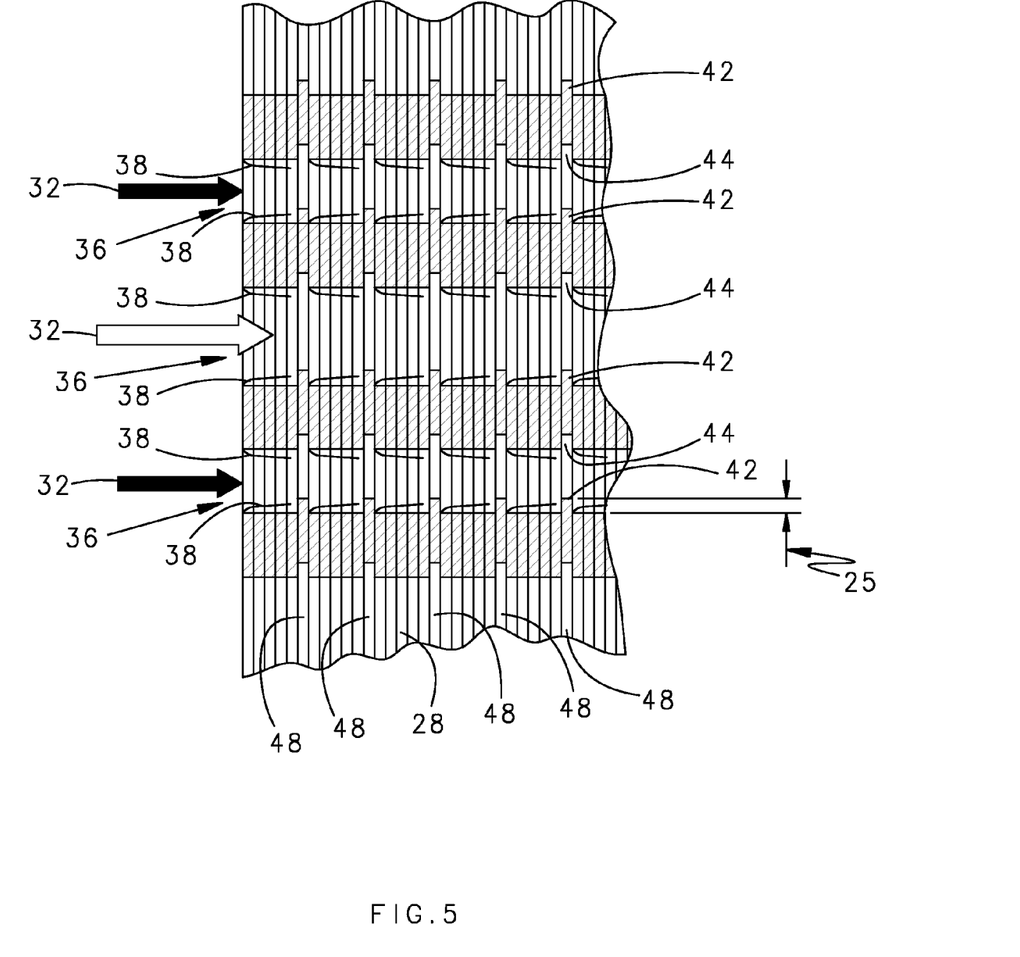
FIG. 5 is an example cooling flow passage including an offset plate.

Referring to FIG. 5, within each of the cooling flow passages 36 is developed a boundary layer 38. The boundary layer 38 is comprised of slower moving or stagnant air adjacent the flow passage walls. This boundary layer 38 reduces the efficiency of the flow of the cooling air therethrough.

Air flow over a surface or between enclosed walls includes a boundary layer region that is next to the solid surface and a core region that is adjacent to the boundary layer region. The boundary layer is where heat is transferred from a solid surface to a cooling fluid flow. The transferred heat to the cooling fluid flow is then moved away by the faster moving air in the core. Thinner boundary layers provide greater heat transfer from the solid to the cooling fluid flow relative to thicker boundary layers. Accordingly, cooling air flow removes heat best when associated with a thinner boundary layer along the surface of the flow passage formed by the fins 26.

The example cooling air passages 36 include at least one plate 48 incremented in position relative to the other of the plates 28 to disrupt air flowing through the air passage 36, thereby disrupting the boundary layer 38 such that the effect of the boundary layer 38 on the effective heat transfer capacity is reduced.

The air flow passages 36 extend longitudinally along the outer perimeter of the core 16 and substantially parallel to the axis of rotation 20. The axially extending air flow passages 36 provide an efficient flow path from the inlet 30 to the outlet 34. Further, the axial orientation of the flow passages 36 simplifies assembly.

In the example illustrated in FIG. 5, each sixth plate 48 is incremented in position arcuately or clocked an arcuate distance 25 relative to the other plates 28 such that a fin 42 extends inwardly into the cooling air flow passage 36. In other words, at least one of the plates is offset circumferentially relative to the other plates 28. The inwardly extending fin 42 disrupts air flow to end any boundary layer 38 generated. The disruption produced by the inwardly extending fin 42 indicated at 40, reduces the size that any single boundary layer 38 can grow. The reduced size of the boundary layers 38 improves cooling air efficiency by increasing the contact areas between moving air and the surfaces defined by the plurality of fins 26 through the passages 36.

The fins 42 that are offset arcuately relative to the corresponding adjacent fins 26 are part of the plate 48 that includes common features and configurations with adjacent features, except that the fins 42 are incremented arcuately relative to the fins 26 of adjacent plates. The plates 48 include the same inner surface features that correspond to the windings 22 and rotor 18 so as to not disrupt symmetrical features that are part of the magnetic circuit. The plate 48 is similar to the adjacent plates with the fins 42 being incremented arcuately the distance 25 to extend into the flow passage 36.

Along with the interruption provided by the fin 42 extending into the air passage 36, a back side of each of the fins 42 defines a recess 44. Each fin 42 that extends into the air flow passage 36 also defines the recess 44 in the adjacent passage. Accordingly, each of the fins 42 that extend into the air flow passage 36 is disposed directly across a recess 44. The recess 44 also disrupts formation of boundary layers in progressive increments along the axial length of each of the flow paths 36.

Figure 6:
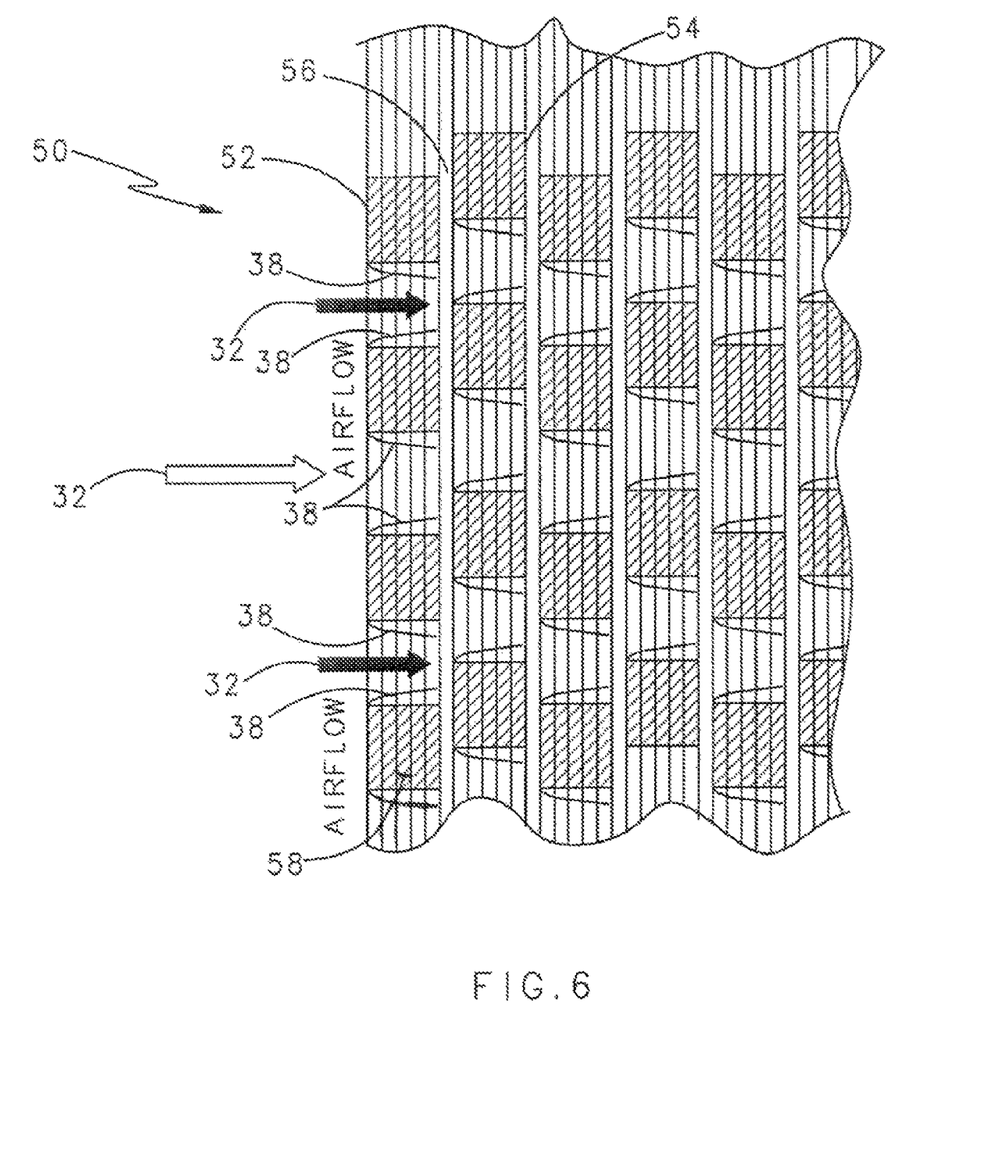
FIG. 6 is another example cooling flow passage including a plurality of offset plates.

Referring to FIG. 6, another example air flow passage 50 includes a first group 52 that is offset arcuately relative to the second group of plates 54. The first group of plates 52 is defined at an initial position and the second group of plates 54 is at a second position offset relative to the first group 52. Between the first group 52 and the second group 54 is a plate 56 that does not include fins. The combination of the offset first and second groups of plates 52, 54 along with the finless plates 56 provides a number of interruptions along the axial length of each passage 50 that defines a tortuous flow path that generates very small boundary layers.

The many small boundaries increase the opportunities for the transfer of heat into the cooling air flow 32. Each of the groups 52,54 are disposed in an offset manner relative to the immediately adjacent groups and are separated by the plate 56 that does not include any fins. The entire first group of fins 52 is disposed at a common angular position relative to the entire second group of fins 54. The consistent position of each of the first groups of fins 52 relative to the second groups of fins 54 provides stepped passages that disrupt air flow and limit boundary layer formation.

In the example flow passage 50, the first group 52, disposed at a first angular position comprises four plates 28 that include fins 58. The second group 54, disposed at a second angular position different than the first angular position includes four plates 28 with fins 58. The difference in angular position between the first group 52 and the second group 54 is determined to provide the desired disruption of air flow 32. Although each of the example first and second groups 52, 54 include four plates, other numbers of plates are within the contemplation of this invention. Further, although the example includes a single finless plate 56 between each of the groups, other numbers of finless plates between each of the groups 52, 54 could also be utilized.

Accordingly, the example electric motor assembly includes a stator with heat exchanger that includes fins sequentially and angularly offset to produce and increase heat transfer capability by limiting the creation of boundary layers through each of the cooling air passages.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A stator assembly for an electric motor comprising:
a core comprising a plurality of plates stacked against each other between a first end and a second end spaced a distance from the first end, the plurality of plates including a plurality of fins that define a plurality of longitudinal cooling air paths that extend longitudinally the entire distance between the first end and the second end along an outer surface, wherein at least one of the plurality of plates include fins that are offset circumferentially relative to the other of the plurality of plates to extend inwardly into each of the plurality of longitudinal cooling air paths for disrupting cooling air flow.

2. The assembly as recited in claim 1, wherein the at least one of the plurality of plates including the fin offset circumferentially comprises a first group of plates that are all offset circumferentially together relative to the remaining plurality of plates not part of the first group of plates.

3. The assembly as recited in claim 1, wherein the at least one of the plurality of plates includes a fin offset circumferentially relative to the remainder of the plurality of plates and recessed inward to define a gap in a lateral boundary of the corresponding longitudinal cooling air path.

4. The assembly as recited in claim 2, wherein the first group of plates includes several groups of plates evenly spaced axially along the plurality of longitudinal cooling air paths.

5. The assembly as recited in claim 3, including a second group of plates disposed between the first group of plates, wherein the second group of plates are together offset arcuately relative to the first group of plates to define irregular cooling air paths that extend axially along the outer surface of the core.

6. The assembly as recited in claim 1, wherein each of the plates includes an outer periphery that includes the plurality of fins and an inner periphery that defines an open space for a rotating member.

7. The assembly as recited in claim 1, wherein at least one of the plurality of plates does not include a plurality of fins and is disposed between plates that include the plurality of fins.

8. The assembly as recited in claim 1, including a plate without fins disposed within the plurality of plates that include the plurality of fins at axially spaced intervals.

9. An electric motor assembly comprising:
a housing including an inner space;
a core supported within the housing, the core including a first end spaced an axial distance from a second end, wherein the core comprises a plurality of plates stacked together about a common axis to define an inner chamber and an outer surface, the outer surface comprising a plurality of longitudinal cooling flow paths that extend longitudinally the entire distance between the first end and the second end defined by fins on the plurality of plates, wherein at least one of the plates includes a feature for disrupting airflow through a corresponding one of said plurality of longitudinal cooling flow paths; and
a rotor supported for rotation within the core.

10. The assembly as recited in claim 9, wherein the feature for disrupting airflow comprises a plate without a fin to define a recessed portion within the plurality of longitudinal cooling flow paths.

11. The assembly as recited in claim 9, wherein each of the plurality of fins are spaced a common distance apart, and at least one of the plurality of fins is incremented relative to the other of the plurality of plates to extend into each of the plurality of longitudinal cooling flow paths.

12. The assembly as recited in claim 9, including a first group of plates and a second group of plates alternately disposed along a length of the core, where the first group of plates is offset arcuately relative to an adjacent second group of plates.

13. The assembly as recited in claim 12, including at least one plate without a fin, the at least one plate without a fin disposed between each of the first group of plates and the second group of plates.

14. The assembly as recited in claim 9, including a plurality of plates that is rotated arcuately relative the other of the plurality of plates, wherein the plurality of rotated plates is spaced apart evenly in an axial direction.

15. The assembly as recited in claim 9, wherein each of the plurality of longitudinal cooling flow paths is parallel to the axis of rotation of the rotor the entire distance between the first and second ends.

16. The assembly as recited in claim 1, wherein the core is disposed about an axis of rotation and each of the plurality of longitudinal cooling air paths extends between the first end and the second end parallel to the axis of rotation.

17. The assembly as recited in claim 1, wherein each of the plurality of longitudinal cooling air paths extends straight along the outer surface of the core from a first end of the core to a second distal end of the core.

18. The assembly as recited in claim 9, wherein each of the plurality of longitudinal cooling air paths are disposed substantially parallel to an axis of rotation.

\* \* \* \* \*

UNITED STATES PATENT AND TRADEMARK OFFICE
CERTIFICATE OF CORRECTION

| | | |
|---|---|---|
| PATENT NO. | : 8,053,938 B2 | Page 1 of 1 |
| APPLICATION NO. | : 11/937688 | |
| DATED | : November 8, 2011 | |
| INVENTOR(S) | : Pal et al. | |

It is certified that error appears in the above-identified patent and that said Letters Patent is hereby corrected as shown below:

ON THE TITLE PAGE:

The Assignee section should read as follows:

(73) Assignee: Hamilton Sundstrand Corporation
Windsor Locks, CT (US)

Signed and Sealed this
Third Day of January, 2012

David J. Kappos
*Director of the United States Patent and Trademark Office*